(12) United States Patent
Amaratunga et al.

(10) Patent No.: US 9,406,985 B2
(45) Date of Patent: Aug. 2, 2016

(54) HIGH EFFICIENCY ENERGY CONVERSION AND STORAGE SYSTEMS USING CARBON NANOSTRUCTURED MATERIALS

(75) Inventors: Gehan Amaratunga, Cambridge (GB); Haolan Wang, Cambridge (GB); Husnu Emrah Unalan, Ankara (TR); Markku Antti Kyosti Rouvala, Cambridge (GB); Di Wei, Cambridge (GB)

(73) Assignee: Nokia Technologies Oy, Espoo (FI)

(*) Notice: Subject to any disclaimer, the term of this patent is extended or adjusted under 35 U.S.C. 154(b) by 666 days.

(21) Appl. No.: 12/319,968

(22) Filed: Jan. 13, 2009

(65) Prior Publication Data
US 2010/0178531 A1    Jul. 15, 2010

(51) Int. Cl.
| H01M 4/02 | (2006.01) |
| H01M 6/16 | (2006.01) |
| H01M 4/583 | (2010.01) |
| H01G 9/04 | (2006.01) |
| H01G 9/042 | (2006.01) |
| H01G 9/045 | (2006.01) |
| H01G 9/145 | (2006.01) |
| H01M 12/00 | (2006.01) |
| B82Y 30/00 | (2011.01) |
| B82Y 40/00 | (2011.01) |
| C01B 31/02 | (2006.01) |
| H01G 11/26 | (2013.01) |
| H01G 11/36 | (2013.01) |
| H01G 11/62 | (2013.01) |
| H01G 11/86 | (2013.01) |
| H01M 4/04 | (2006.01) |
| H01M 4/133 | (2010.01) |
| H01M 4/1393 | (2010.01) |
| H01M 4/66 | (2006.01) |
| H01M 10/0525 | (2010.01) |
| H01M 4/88 | (2006.01) |
| H01M 2/16 | (2006.01) |

(52) U.S. Cl.
CPC ............ *H01M 12/005* (2013.01); *B82Y 30/00* (2013.01); *B82Y 40/00* (2013.01); *C01B 31/0233* (2013.01); *H01G 11/26* (2013.01); *H01G 11/36* (2013.01); *H01G 11/62* (2013.01); *H01G 11/86* (2013.01); *H01M 4/0404* (2013.01); *H01M 4/133* (2013.01); *H01M 4/1393* (2013.01); *H01M 4/661* (2013.01); *H01M 4/663* (2013.01); *H01M 10/0525* (2013.01); *H01M 2/1653* (2013.01); *H01M 4/8842* (2013.01); *Y02E 60/122* (2013.01); *Y02E 60/13* (2013.01); *Y02P 70/54* (2015.11)

(58) Field of Classification Search
CPC . H01M 4/133; H01M 4/1393; H01M 4/8842; H01M 4/663; H01G 11/36; H01G 11/62
See application file for complete search history.

(56) References Cited

U.S. PATENT DOCUMENTS

| 3,621,032 | A | 11/1971 | Ariyan et al. |
| 4,315,163 | A | 2/1982 | Bienville |
| 5,346,683 | A | 9/1994 | Green et al. |
| 5,648,056 | A | 7/1997 | Tanaka |
| 5,726,524 | A | 3/1998 | Debe |
| 5,780,101 | A | 7/1998 | Nolan et al. |
| 5,916,642 | A | 6/1999 | Chang |
| 6,017,651 | A | 1/2000 | Nimon et al. |
| 6,110,619 | A * | 8/2000 | Zhang et al. ............ 429/213 |
| 6,283,812 | B1 | 9/2001 | Jin et al. |
| 6,303,094 | B1 | 10/2001 | Kusunoki et al. |
| 6,863,942 | B2 | 3/2005 | Ren et al. |
| 7,122,276 | B2 | 10/2006 | Gu |
| 7,553,580 | B2 | 6/2009 | Cho et al. |
| 8,277,770 | B2 | 10/2012 | Awano et al. |
| 2003/0162078 | A1* | 8/2003 | Kikuchi et al. ............ 429/38 |
| 2004/0131937 | A1 | 7/2004 | Chen et al. |
| 2004/0160156 | A1 | 8/2004 | Ohata et al. |
| 2004/0234841 | A1 | 11/2004 | Yoshitake et al. |
| 2005/0008934 | A1 | 1/2005 | Oyama et al. |
| 2005/0118440 | A1 | 6/2005 | Mahon et al. |
| 2005/0121309 | A1 | 6/2005 | Chhowalla et al. |
| 2005/0260460 | A1 | 11/2005 | Kishi et al. |

(Continued)

FOREIGN PATENT DOCUMENTS

| CN | 1877890 A | 12/2006 |
| CN | 101315974 A | 12/2008 |

(Continued)

OTHER PUBLICATIONS

Reetz et al., "Platinum-Nanoparticles on Different Types of Carbon Supports: Correlation of Electrocatalytic Activity with Carrier Morphology", Chimia 58 (2004) 896-899.*

Serp et al. J., "Novel carbon supported material: highly dispersed platinum particles on carbon nanospheres", Mater. Chem., 2001, 11, 1980-1981.*

Bushueva et al., "Double layer supercapacitor properties of onion-like carbon materials", phys. stat. sol. (b) 245, No. 10, 2296-2299 (2008).*

(Continued)

*Primary Examiner* — Ladan Mohaddes
(74) *Attorney, Agent, or Firm* — Alston & Bird LLP

(57) ABSTRACT

An energy storage device structure comprises a first electrode layer, an electrolyte layer and a second electrode layer. At least one of the electrode layers comprise a metallic base layer, a layer of carbon nanotubes grown on the base layer and a layer of carbon nanoparticles disposed on the carbon nanotube layer, the carbon nanoparticle layer being arranged to face the electrolyte layer. The structure has much larger width and length than thickness, so it is rolled up or folded and then hermetically sealed to form an energy storage unit. The layer of carbon nanotubes is grown on the metallic base layer by a chemical vapor deposition process at a temperature no higher than 550° C. The carbon nanotubes in the carbon nanotube layer are at least partially aligned in a direction that is perpendicular to the surface of the metallic base layer.

10 Claims, 6 Drawing Sheets

(56) References Cited

U.S. PATENT DOCUMENTS

| | | | |
|---|---|---|---|
| 2006/0051663 A1* | 3/2006 | Fujita et al. | 429/142 |
| 2006/0107997 A1 | 5/2006 | Matsui et al. | |
| 2006/0172180 A1 | 8/2006 | Okamura et al. | |
| 2006/0204853 A1 | 9/2006 | Chen | |
| 2006/0233692 A1 | 10/2006 | Scaringe et al. | |
| 2007/0092796 A1 | 4/2007 | Matsuda et al. | |
| 2007/0122712 A1 | 5/2007 | Kang et al. | |
| 2007/0190422 A1 | 8/2007 | Morris | |
| 2007/0258192 A1* | 11/2007 | Schindall et al. | 361/503 |
| 2008/0039557 A1 | 2/2008 | Li et al. | |
| 2008/0044732 A1 | 2/2008 | Salot et al. | |
| 2008/0131779 A1 | 6/2008 | Kami et al. | |
| 2008/0204990 A1 | 8/2008 | Kuo | |
| 2008/0212261 A1 | 9/2008 | Ajayan et al. | |
| 2008/0220329 A1 | 9/2008 | Kojima et al. | |
| 2008/0280207 A1 | 11/2008 | Patoux et al. | |
| 2008/0299460 A1 | 12/2008 | Feng et al. | |
| 2009/0042102 A1 | 2/2009 | Cui et al. | |
| 2009/0098457 A1 | 4/2009 | Kwon et al. | |
| 2009/0162711 A1* | 6/2009 | Fujita | 429/23 |
| 2009/0296315 A1* | 12/2009 | Eguchi et al. | 361/502 |
| 2009/0316335 A1 | 12/2009 | Simon et al. | |
| 2010/0019205 A1* | 1/2010 | Nakanishi et al. | 252/500 |
| 2010/0021797 A1* | 1/2010 | Zhang et al. | 429/42 |
| 2010/0178568 A1 | 7/2010 | Unalan et al. | |
| 2010/0216023 A1 | 8/2010 | Wei et al. | |
| 2011/0070489 A1* | 3/2011 | Chiang et al. | 429/209 |
| 2011/0091773 A1 | 4/2011 | Wei | |
| 2011/0171559 A1* | 7/2011 | Zhang et al. | 429/481 |

FOREIGN PATENT DOCUMENTS

| | | | |
|---|---|---|---|
| EP | 1 061 043 A1 | | 12/2000 |
| EP | 1 383 186 A1 | | 1/2004 |
| JP | 7-61803 A | | 3/1995 |
| JP | 10-265208 A | | 10/1998 |
| JP | 2001-064004 A | | 3/2001 |
| JP | 2003317794 | | 11/2003 |
| JP | 2005-039295 A | | 2/2005 |
| KR | 2002 0042473 A | | 6/2002 |
| KR | 2011 0104553 A | | 9/2011 |
| WO | WO 95/10481 A1 | | 4/1995 |
| WO | WO 96/09246 A1 | | 3/1996 |
| WO | WO 99/65821 A1 | | 12/1999 |
| WO | WO 2004/000728 | | 12/2003 |
| WO | WO 2005/069412 | | 7/2005 |
| WO | WO 2005/114686 | | 12/2005 |
| WO | WO2008004635 | * | 1/2008 |
| WO | WO 2008/070926 | | 6/2008 |
| WO | 2010089991 | | 8/2010 |

OTHER PUBLICATIONS

"Materials Challenges Facing Electrical Energy Storage" M. Stanley Whittingham (Binghamton University, USA), MRS Bulletin, vol. 33, Apr. 2008.
"Ultrathick Freestanding Aligned Carbon Nanotube Films" Lijie Ci, Shaijumon et al., Advanced Materials 2007, pp. 3300-3303.
"Large-scal synthesis of single-walled carbon nanohorns by submerged arc" H. Wang, et al., Institute of Physics Publishing, Nanotechnology 2004, pp. 546-550.
"Flexible energy storage devices based on nanocomposite paper" Victor L. Pushparaj et al., PNAS, Aug. 21, 2007, vol. 104, No. 34, pp. 13574-13577.
"Growth of Manganese Oxide Nanoflowers on Vertically-Aligned Carbon Nanotube Arrays for High-Rate Electrochemical Capacitive Energy Storage" Hao Zhang et al., Nano Letters, 2008, vol. 8, No. 9, pp. 2664-2668.
European Patent Office; S. Kiliaan; "International Search Report and Written Opinion of the International Searching Authority"; whole document; Mar. 25, 2010; Munich, Germany, 13 pages total.
International Search Report (6 pages) and Written Opinion (8 pages) mailed Dec. 1, 2010 in related International Application No. PCT/FI2010/050642.
Japanese Publication No. 2003-317794, published Nov. 7, 2003, Tsutsumi Kazuo et al., English Abstract (1 page).
International Publication No. WO 2010-089991, published Aug. 12, 2010, Sakai Tetsuo et al., English Abstract (1 page).
Office Action for U.S. Appl. No. 12/579,563 dated Apr. 11,2012.
Akridge, J. R. et al.; Li/S fundamental chemistry and application to high-performance rechargeable battery; Solid State Ionics; 175; 2004; p. 243-245.
Arico, A. S. et al.; "Nanostructured Materials for Advanced Energy Conversion and Storage Devices"; Nature Materials, 4 (2005) 366.
Bell, M. S. et al., *Carbon Nanotubes by Plasma-Enhanced Chemical Vapor Deposition*, Pure and Applied Chemistry, vol. 78, No. 6, (2006) 1117-1125.
Chung, K. et al.; "Lithium phosphorus oxynitride as a passive layer for anodes in lithium secondary batteries", Journal of Electroanalytical Chemistry; 2003; p. 263-267.
Cunningham, P.T. et al.; "Phase Equilibria in Lithium-Chalcogen Systems"; J. Electrochem. Soc.; 119; 1972; p. 1448-1450.
Endo, M. et al., *Potential Applications of Carbon Nanotubes*, Carbon Nanotobes, Topics Appl. Physics 111, (2008) 13-62.
Heitner, K., (Manager) *Advances Promise High Cycle Life, Commercial Viability for Electric Vehicles*, Advanced Electric Vehicle Batteries.
Ji, Xieulei et al.; "A highly ordered nanostructured carbon-sulphur cathode for lithium-sulphur batteries"; Nature Materials, vol. 8, Jun. 2009, p. 500-506.
Prachi-Patel-Predd, *Nanoflowers Improve Ultracapacitors*, Technology Review, Sep. 16, 2008.
Shin, J. H. et al.; "Characterization of N-Methyl=N-Butylpyrrolidinium Bis (trifluoromethanesulfonyl)imde-LtTFSI-Tetra(ethylene glycol) Dimethyl Ether Mixtures as a Li Metal Cell Electrolyte"; Journal of the Electrochemical Society; 155; 2008; p. A368-A373.
Yang et al.; "Nanowindow-Regulated Specific Capacitance of Supercapacitor Electrodes of Single-Wall Carbon Nanohorns"; J Am. Chem. Soc., 129 (2007) 20.
Yeh, J. et al.; "Noncovalent Interaction Between Gold Nanoparticles and Multiwalled Carbon Nanotubes via an Intermediatory"; Journal of Nanotechnology; 2009; p. 1-7.
Office Action for U.S. Appl. No. 12/579,563, dated Oct. 24, 2012.
Linden, et al.; Handbook of Batteries ($3^{rd}$ Edition) (2002).
Office Action from U.S. Appl. No. 12/586,995 dated Aug. 31, 2012.
Office Action for U.S. Appl. No. 12/319,933 dated Feb. 29, 2013.
Office Action for Korean Application No. 007118805 dated Jan. 31, 2013.
International Search Report for Application No. PCT/US99/13648 dated Oct. 21, 1999.
Kang, M. G., et al.; "*A 4.2% efficient flexible dye-sensitized $TiO_2$ solar cells using stainless steel substrate*," Solar Energy Materials and Solar Cells, vol. 90, No. 5; pp. 574-581; dated Mar. 23, 2006, abstract retrieved on Jul. 31, 2013 from <http://www.sciencedirect.com/science/article/pii/S0927024805001182>.
Tian, B., et al.; "*Coaxial silicon nanowires as solar cells and nanoelectronic power sources*," Nature Letters, vol. 449, No. 7164; pp. 885-889; dated Oct. 18, 2007; retrieved on Jul. 31, 2013 from <www.eecs.umich.edu/zhonglab/pub/NW_Solar_Lieber.pdf>.
U.S. Office Action for U.S. Appl. No. 12/586,995, dated Apr. 25, 2013.
Office Action for Chinese Application No. 201080004525.2; dated Jul. 12, 2013.
Emmenegger, Ch. et al., *Carbon Nanotube Synthesized on Metallic Substrates*, Applied Surface Science 162-163 (2000) 452-456.
Hiraoka, T. et al., *Synthesis of Single- and Double-Walled Carbon Nanotube Forests on Conducting Metal Foils*, J. Am. Chem. Soc. 128 (2006) 13338-13339.
Office Action for Chinese Application No. 201080004524.8 dated Nov. 26, 2013.
Office Action for U.S. Appl. No. 12/586,995 dated Dec. 16, 2013.
Office Action for U.S. Appl. No. 12/319,933 dated Mar. 7, 2014.
Office Action for U.S. Appl. No. 12/319,933 mailed Nov. 24, 2014.
Takikawa et al.; "Fabrication of Single-Walled Carbon Nanotubes and Nanohorns by Means of a Torch Arc in Open Air"; *Physica B: Condensed Matter*; vol. 323; Issues 1-4; Oct. 2002; pp. 277-279.

(56) References Cited

OTHER PUBLICATIONS

Office Action from European Application No. 10 700 837.7 dated Sep. 21, 2012.
International Search Report and Written Opinion from International Application No. PCT/EP2010/050167, dated Apr. 1, 2010.
Office Action for U.S. Appl. No. 12/319,933, dated Jul. 18, 2014.
Office Action for U.S. Appl. No. 12/586,995, dated Oct. 31, 2014.
Reetz, et al.; "Platinum-Nanoparticles on Different Types of Carbon Supports: Correlation of Electrocatalytic Activity with Carrier Morphology"; Chimia 58 (2004) 896-899.
Serp et al.; "Novel Carbon Supported Material: Highly Dispersed Platinum Particles on Carbon Nanospheres"; Mater. Chem.; 2001, 11, 1980-1981.
Office Action for U.S. Appl. No. 12/586,995 mailed Mar. 6, 2015.
Office Action for U.S. Appl. No. 12/319,933 mailed Mar. 5, 2015.
Aissa et al.; "Carbon Nanohorns-Coated Microfibers for use as Free-Standing Electrodes for Electrochemical Power Sources"; Electrochemistry Communications; vol. 11, Issue 4, Apr. 2009; pp. 862-866.
Office Action for U.S. Appl. No. 12/586,995 dated Jul. 8, 2015.

* cited by examiner

HIGH EFFICIENCY ENERGY CONVERSION AND STORAGE SYSTEMS USING CARBON NANOSTRUCTURED MATERIALS

DISCLOSURE OF JOINT RESEARCH AGREEMENT

The claimed invention was made under a joint research agreement between Nokia Corporation, Finland, and University of Cambridge, United Kingdom. The joint research agreement was in effect before the date the claimed invention was made, and the claimed invention was made as a result of activities undertaken within the scope of the joint research agreement.

TECHNICAL FIELD

This disclosure relates to energy conversion and storage systems. In particular, this disclosure relates to energy conversion and storage systems using complex carbon nanostructured materials as functional components.

BACKGROUND ART

The ever-increasing demand for portable electronic devices motivates technological improvements in energy conversion and storage units used in these devices. In developing the energy conversion and storage units, such as batteries, lightweight construction, long lifetime, high energy density, high power density and flexibility to meet various design and power needs are important factors to consider. Energy density and power density are two different perspectives of the energy storage devices. Energy density is measured by how long a mobile device can operate, such as making phone calls and uploading data, and how long it can standby. High power density is needed in providing fast bursts of current in power demanding applications on devices such as cameras, hard disk drive, high-resolution displays, etc. Examples of the energy conversion and storage units suitable for portable electronic devices include lithium ion batteries, lithium metal batteries and supercapacitors.

Lithium ion batteries are currently one of the most popular types of solid-state batteries for portable electronic devices, with one of the best energy-to-weight ratios, no memory effect, and a long shelf life. The three primary functional components of a lithium ion battery are anode, cathode and electrolyte, for which a variety of materials may be used. Commercially, the most popular material for the anode is graphite. The cathode may be made with an intercalation lithium compound such as lithium cobalt oxide, lithium iron phosphate, lithium manganese oxide, etc.

Lithium metal batteries, or lithium metal polymer batteries, are rechargeable batteries that evolved from lithium-ion batteries. A lithium-metal battery structure comprises a lithium metal anode, a polymer composite electrolyte and a cathode. Lithium metal batteries can be produced by stacking thin films of these materials together. The resulting device structure is flexible, tough, and durable. The advantages of lithium metal polymer structure over the traditional lithium ion design include lower cost of manufacturing and being more robust to physical damage.

Supercapacitors resemble a regular capacitor except that it offers very high capacitance in a small package. There are two types of supercapacitors, electrochemical double layer capacitor and peuseodocapacitor. In electric double layer capacitor (EDLC), energy storage is by means of static charge rather than an electro-chemical process that is inherent to the batteries. Applying a voltage differential on the positive and negative plates charges the supercapacitor. Whereas a regular capacitor consists of conductive foils and a dry separator, the supercapacitor crosses into battery technology by using electrodes and electrolyte that are similar to lithium ion or lithium metal batteries. Hence, a combination of battery and supercapacitor in a unit is of great interest for achieving high energy density and power density.

Energy storage units with combinations of batteries and capacitors have been proposed, and applied in electronic devices, but no combined battery-supercapacitor unit has been developed to fill the area 1 in the Ragone plot (power density vs. energy density) as shown in FIG. 1. A device falling in this area is very desirable from application point of view, because it offers a very high energy density and a very high power density at the same time. Ideally, a combined battery/supercapacitor should have the power of a supercapacitor with the storage capacity of a battery. Like a capacitor, it can be rapidly charged then discharged to deliver power. Like a battery, it can store and deliver that charge over long periods of time.

Recently, nanostructured materials are being used in rechargeable batteries as cathode or anode in order to enhance the battery capacity and durability. Nanostructured carbon, such as carbon nanotubes (CNTs), carbon nanowires (CNWs), carbon nanohorns (CNHs) and carbon nano-onions (CNOs) are being contemplated for replacing graphite. CNT is a highly crystallized tubular structure of carbon. One single wall nanotube (SWNT) is about a few nanometers in diameter and up to a hundred microns long, multiwall nanotubes (MWNT), which are typically the case in vertical growth, are larger in diameter and equally long or longer. Millions of carbon nanotubes together may form a cluster of macroscopic material that is practically useful. CNTs may be grown from a smooth substrate to form a layer of densely packed, vertically aligned CNT pile (morphologically similar to a pile of fiber on a carpet).

CNH and CNO are highly crystallized nanoparticle structures of carbon. Single wall carbon nanohorns (SWCNHs) are structured from cone-shaped hollow carbon (graphene) crystallite about two to three nanometers long. They aggregate to form dahlia-, or bud-like nanoparticle structures 50 to 100 nanometers in diameter and are spherical or near spherical in shape, with nanocones on the surface (see FIG. 2). CNOs are ball-shaped crystallite (fullerenes) with one carbon ball enclosing another carbon ball.

The advantage of using CNHs and CNOs in energy conversion and storage devices lies not only in the extremely large surface area but also easy permeation for gas and liquid, because of surface defects, openings and windows in the crystal surface structures naturally generated by a submerged discharge process. CNHs are also especially applicable to surface adsorption processes because of the non-uniform diameter throughout the cone structure, resulting from the hexagon-pentagon distribution on the surface, instead of the even hexagon structure of the pure graphene layers like on graphite, or pure CNTs. CNH cones are built in certain cone angles with fullerene hemisphere tip at the end. The angles are defined in pure cone structures in 19, 39, 60, 84 and 113 degrees—the wider the cone angle, the shorter the nanocones. CNHs can be produced by a laser ablation process or a submerged arc-discharge process. The latter process is more promising for volume production with greatly reduced cost.

In this disclosure, we describe a complex carbon nanostructure which includes a layer of CNH (or CNO) particles on a layer of highly packed and vertically aligned CNT structure grown on a flexible metal substrate. The complex CNT/

CNH(CNO) nanostructure thus resulted can be directly used for electrodes in rechargeable batteries and supercapacitors. The process is suitable for mass productions of the nanostructured carbon material and mass production of the above-described energy conversion and storage units comprising the nanostructured carbon material.

SUMMARY OF THE INVENTION

In a first aspect of the invention, a device is provided. The device comprises a first sheet of a conductive material; a sheet of a substance disposed on the first sheet of the conductive material, the substance being able to conduct free ions therein; and a second sheet of same or different conductive material disposed on the sheet of the substance. At least one of the first sheet and second sheet comprises a metal foil layer, a carbon nanotube layer directly grown on the metal foil layer, and a layer of carbon nanoparticles disposed on the carbon nanotube layer. The carbon nanoparticle layer is arranged to face the sheet of the substance.

In the device, the first sheet, the sheet of the substance and the second sheet may form a multi-layered stack, and the device may further comprise a first insulating sheet and a second insulating sheet disposed on outer surfaces of the multi-layered stack, respectively.

The device may have much larger width and length than thickness. It is rolled up or folded and then hermetically sealed to form an energy storage unit.

The energy storage unit may be a rechargeable battery, a capacitor, or may function as a battery-capacitor hybrid, and the first and the second conductive sheets are configured to engage with an external energy source or drain.

The metal foil may be one of the following: aluminum, copper, iron, and alloys of aluminum, copper or iron. The metal foil may have a thickness of 5 to 100 microns.

The carbon nanotube layer may be directly grown on the metal foil by a process that comprises coating a catalyst on a surface of the metal foil by low temperature evaporation of the catalyst; annealing the catalyst coated metal foil in ammonia gas at a first temperature; and growing the carbon nanotubes directly on the catalyst coated surface of the metal foil in a hydrocarbon gas atmosphere at a second temperature. The first temperature is lower than the second temperature and the second temperature is no higher than 550° C.

In the device, the sheet of the substance may comprise a sheet of microperforated plastic film and an electrolyte disposed on surfaces of the plastic film. The microperforated plastic film may be a membrane made of polyethylene (PE)-polypropylene (PP). The electrolyte may be a composite of a lithium salt and one of the following polymers: ethylene carbonate (EC), diethylene carbonate (DC) and propylene carbonate (PC). Or, the electrolyte may be a room temperature ionic liquid electrolyte. The room temperature ionic liquid electrolyte may comprise 1-butyl, 3-methylimidazolium chloride ([BMIM] [Cl]), 1-25% of cellulose and a lithium salt.

The carbon nanotubes in the carbon nanotube layer are at least partially aligned in a direction. The direction may be at least nearly perpendicular to the surface of the metal foil. The carbon nanoparticles are typically carbon nanohorns or carbon nano-onions, but any other carbon nano- or microparticles (like nanopotatoes (NP)) resulting from the submerged arc discharge process could be used in addition to the carbon nanohorns or carbon nano-onions.

In a second aspect of the invention, a process for forming a layer of carbon nanostructure on a flexible metal foil is provided. The process comprises coating a catalyst on a surface of the metal foil by low temperature evaporation of the catalyst; annealing the catalyst coated metal foil in ammonia gas at a first temperature; and growing carbon nanotubes directly on the catalyst coated surface of the metal foil in a hydrocarbon gas atmosphere at a second temperature. The first temperature is lower than the second temperature and the second temperature is no higher than 550° C.

The process may further comprise disposing a layer of carbon nanoparticles on the surface of the carbon nanotubes. The carbon nanoparticles may be carbon nanohorns, carbon nano-onions, or a combination of two or more types of carbon nanoparticles.

The metal foil may be one of the following: aluminum, copper, iron, and alloys of aluminum, copper or iron. The metal foil may have a thickness of 5 to 100 microns.

The catalyst may comprise one of the following: iron, nickel and cobalt. The catalyst may have a particle size of no more than 50 nanometers.

The carbon nanotubes may be grown to a length of 10 to 100 microns. The carbon nanotubes grown on the metal foil are at least partially aligned in a direction, said direction being at least nearly perpendicular to the surface of the metal foil.

The process is at least partially carried out in a chemical vapor deposition system.

In a third aspect of the invention, a method is provided. The method comprises providing a first sheet of a conductive material; disposing a sheet of a substance on the first sheet of the conductive material, the substance being able to conduct free ions therein; and disposing a second sheet of same or different conductive material on the sheet of the substance. At least one of the first sheet and second sheet comprises a metal foil layer, a carbon nanotube layer directly grown on the metal foil layer, and a layer of carbon nanoparticles disposed on the carbon nanotube layer. The carbon nanoparticle layer is arranged to face the sheet of the substance.

In the method, the first sheet, the sheet of the substance and the second sheet form a multi-layered stack, and the method further comprises disposing a first insulating sheet and a second insulating sheet on outer surfaces of the multi-layered stack, respectively.

The multi-layered stack may have much larger width and length than thickness, and the method further comprises rolling up or folding the multi-layered stack; and hermetically sealing the rolled-up or folded multi-layered stack to form an energy storage unit.

The energy storage unit may be a rechargeable battery or a capacitor, or may function as a battery-capacitor hybrid, and the method may further comprise connecting the first and the second conductive sheets with an external energy source or drain.

The carbon nanotube layer is grown directly on the metal foil layer by a process that comprises coating a catalyst on a surface of the metal foil by low temperature evaporation of the catalyst; annealing the catalyst coated metal foil in ammonia gas at a first temperature; and growing the carbon nanotubes directly on the catalyst coated surface of the metal foil in a hydrocarbon gas atmosphere at a second temperature. The first temperature is lower than the second temperature and the second temperature is no higher than 550° C.

The above process may further comprise disposing a layer of carbon nanoparticles on the surface of the carbon nanotubes. The carbon nanoparticles may be carbon nanohorns, carbon nano-onions, or a combination of two or more kinds of carbon nanoparticles. The process for growing the carbon nanotube layer may be at least partially carried out in a chemical vapor deposition system.

BRIEF DESCRIPTION OF THE DRAWINGS

The features and advantages of the invention will become apparent from a consideration of the subsequent detailed description presented in connection with accompanying drawings, in which.

DETAILED DESCRIPTION

Figure 1:
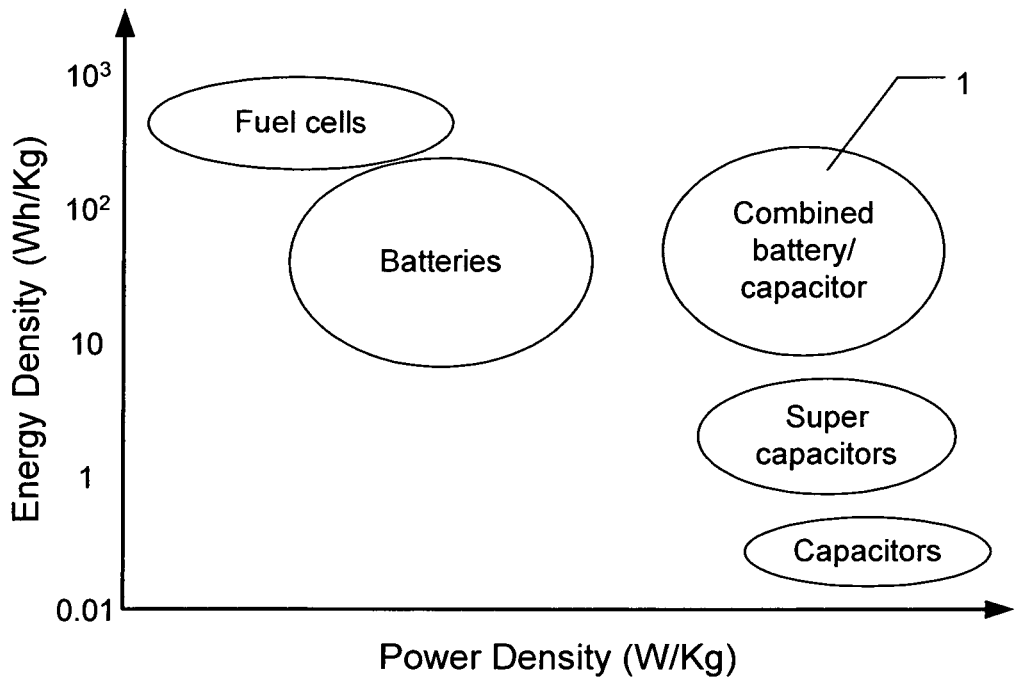
FIG. 1 is a Ragone plot showing the current state of art in energy conversion and storage systems.
Figure 2:
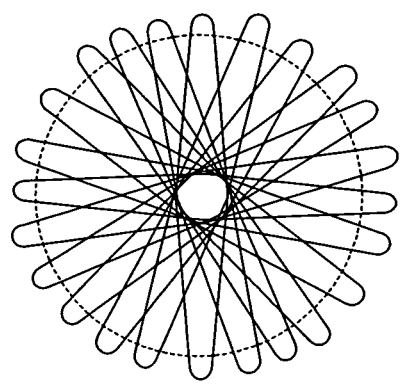
FIG. 2 is a schematic illustration of a CNH particle.
Figure 3A:
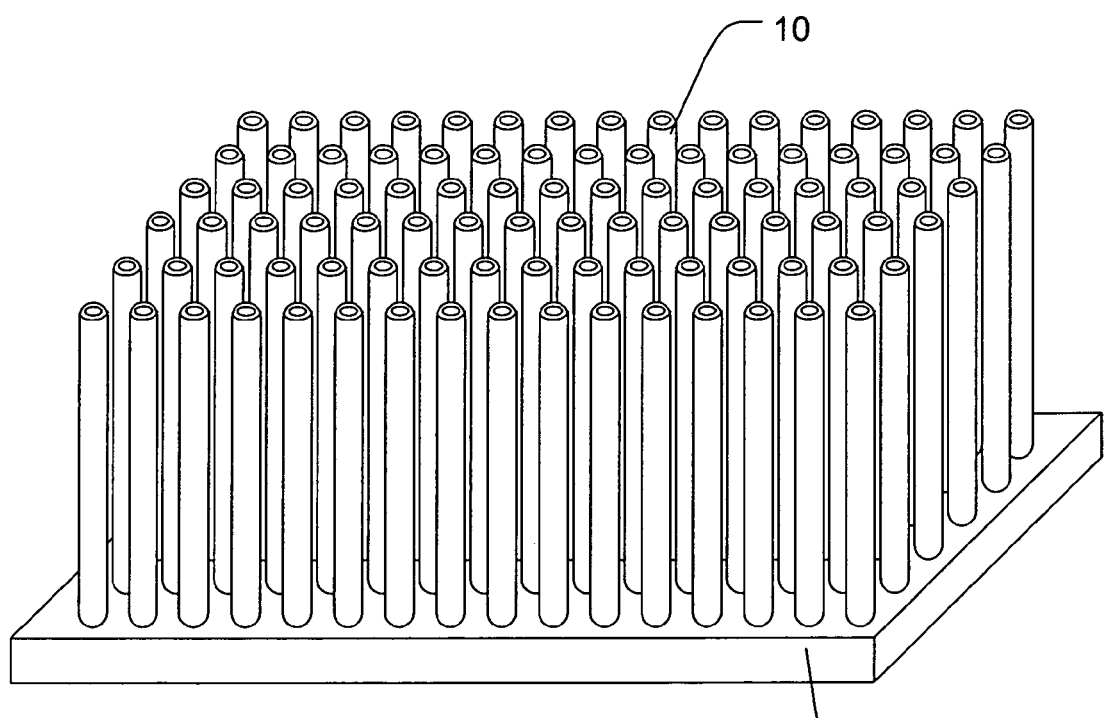
FIG. 3a is a schematic illustration of a layer of aligned CNTs grown on a flexible metal foil substrate.

Aligned multiwall carbon nanotubes (MWNT) can be grown on different charge collecting electrodes such as graphite, aluminum (Al), copper (Cu), steel and semiconductors like silicon (Si). FIG. 3a shows, schematically, a sheet of densely packed, vertically aligned carbon nanotubes 10 on a substrate 20. For achieving a maximum surface area, ideally a CNT sheet should have CNTs densely packed (one nanotube next to another with gaps between the nanotubes about the same size as the Li ion) and aligned perpendicular or nearly perpendicular to the surface of the substrate. By directly growing the CNTs on a flexible conductive substrate, the CNTs do not have to be removed from the substrate for the applications, and the substrate can be directly used in those energy storage devices where the components thereof must be folded or rolled for minimizing the overall volume of the devices. This not only simplifies the manufacturing procedure but also makes it more cost effective.

The growth of the CNTs on the substrate is preferably carried out by a low temperature plasma enhanced chemical vapor deposition (PECVD) method. The deposition process utilizes nanoparticles of a metal catalyst to react with a hydrocarbon gas. In the deposition process, the catalyst decomposes the hydrocarbon gas to produce carbon and hydrogen. The carbon dissolves into the particle and precipitates out from its circumference as the carbon nanotube. Thus, the catalyst acts as a "template" from which the carbon nanotube is formed, and by controlling the catalyst particle size and reaction time, one can tailor the nanotube diameter and length respectively to suit. CNTs, in contrast to solid carbon nanowires, tend to form when the catalyst particle is ~50 nm or less.

Typically, the CVD growth temperature is higher than 700° C., which prohibits the use of many substrates. In the present invention, aligned carbon nanotubes are grown directly on thin and flexible metal foils at a temperature no higher than 550° C.

A metal foil is cut to size and cleaned consecutively by acetone and by isopropanol in an ultrasonic bath for 5 minutes each, followed by rinsing with de-ionized water and drying in a nitrogen flow. The metal foil may be made of various metals or alloys such as Al, Cu or stainless steel, preferably Al or Cu. Conventional metal foils can be manufactured by various methods known in the art, so normally these foils are commercially available. The thickness of the metal foil can be from 5 to 100 μm so long as it has sufficient mechanical strength and desired flexibility. Impurities in the metal foil should be sufficiently low so that they do not inhibit the CNT growth and contaminate the growth equipment.

Before the CNT growth, a layer of the catalyst is deposited on the surface of the substrate. Suitable catalysts include iron (Fe), nickel (Ni) and cobalt (Co). CNT growth is carried out in a quartz vacuum chamber of a chemical vapor deposition (CVD) system. One example of a commercially available CVD system is Aixtron Nanoinstruments Plasma Enhanced Chemical Vapor Deposition system. One or more catalyst-coated substrates are placed on a resistively heated graphite stage in the quartz chamber. Growth temperature is controlled by a thermocouple attached to the surface of the graphite stage. The metal foil substrates are heated up in an ammonia gas ($NH_3$) atmosphere to 450° C. and annealed at 450° C. for a predetermined period.

After the annealing, the temperature of the graphite stage is ramped up to 520° C. (for Al foil) or to 540° C. (for Cu foil) and acetylene ($C_2H_2$) was supplied as the carbon feedstock for the CNT growth. After the CNTs have grown to the desired length, the substrates are cooled to room temperature. Nitrogen gas ($N_2$) was supplied at the end of the growth. It is observed that 15 minutes of growth time may yield 30 to 40 μm long CNTs on an Al foil and 70-80 μm long CNTs on a Cu foil.

A complex "carbon nanoparticle on flexible CNT layer" structure is built using the as-grown CNT nanostructure as a scaffold. This results in a remarkable increase in electrode surface area. Carbon nanoparticles, such as CNHs, CNOs and a combination of two or more kinds of nanoparticles, can be fabricated using two known methods: (1) laser ablation of graphite bar in inert-gas-atmosphere chamber; or (2) submerged arc-discharge method, where high voltage is introduced to a metal bar, which is brought close to graphite bar in a liquid. In this application, CNH/CNO nanoparticles are fabricated using arc-discharge in water/nitrogen natural chamber method but the other method can also be applied.

Typical liquids used are de-ionized water for CNOs and liquid nitrogen for CNHs. CNHs were produced by the submerged arc method in liquid nitrogen and dispersed in water. The submerged arc method requires only a direct current (DC) power supply, carbon electrodes and liquid nitrogen. This method is outstandingly simple and economical compared to conventional techniques used to generate carbon nanostructures such as fullerenes and nanotubes. The ability to produce significant quantities of SWNHs in a cost effective manner is an important factor for their use in energy storage applications where large quantities (kilograms) of the nanoparticles are needed.

Briefly, a DC arc discharge was generated between two graphite electrodes submerged in 2000 $cm^3$ of liquid nitrogen in a stainless steel Dewar. The arc discharge was initiated in the liquid nitrogen by touching a 99.99% purity graphite anode (3 mm in diameter) with a graphite cathode (12 mm tip diameter) of similar purity. The arc voltage and current were typically 34 V and 50 A, respectively, but may be adjusted for achieving optimum production rate. The gap between the electrodes was kept constant at around 1 mm by continuously translating the anode during the experiment in order to maintain a stable discharge. The arc discharge in liquid nitrogen is turbulent, and dense black smoke is observed near the discharge region. The evaporation rate of liquid nitrogen was about 200 cm$^3$/min and the anode consumption rate was about 375.3 mg/min. In contrast to the discharge in water, the products from the arc discharge in liquid nitrogen settle exclusively at the bottom of the insulated Dewar. The resulted products consist of MWNTs, amorphous carbon and SWNH aggregates. The average diameter of the CNHs is in the range of 20 to 100 nm.

Figure 3B:
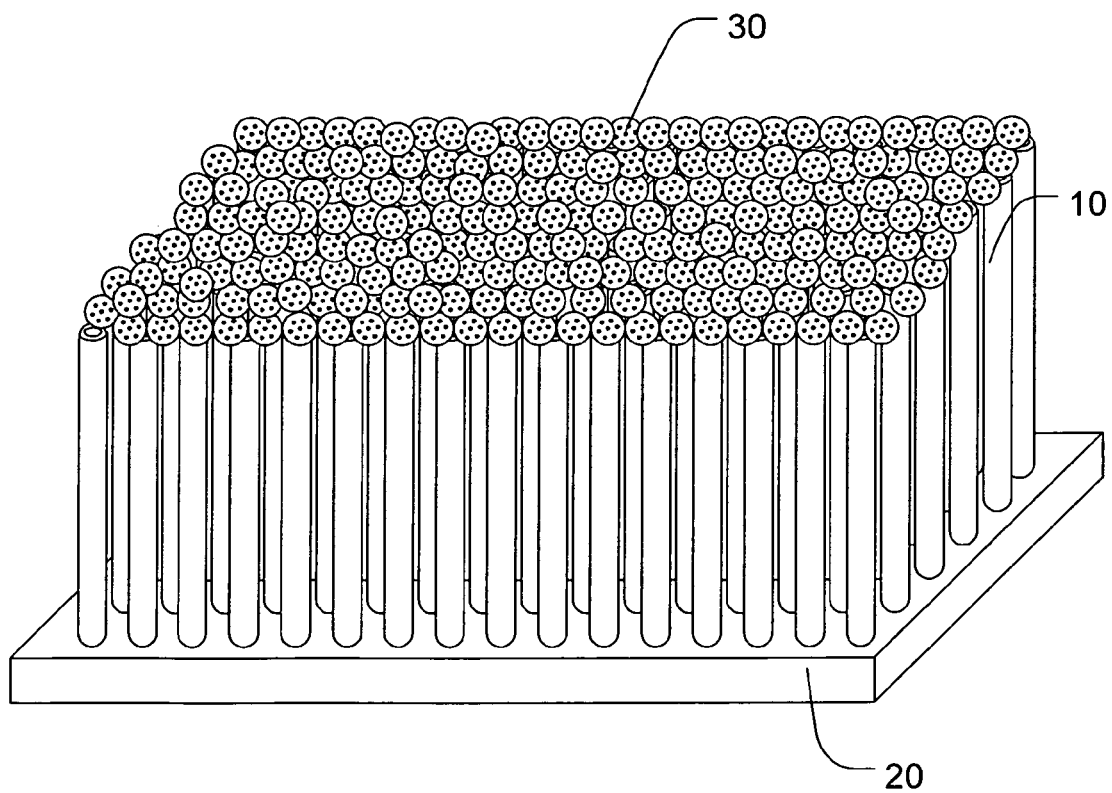
FIG. 3b is a schematic illustration of a layer of carbon nanoparticles deposited on the aligned carbon nanotubes.

As shown in FIG. 3b, the CNHs or CNOs can then be disposed on the surface of a CNT layer 10 grown on a metal foil substrate 20 by different means (such as drop casting, sublimation and spin coating, etc.), leaving the CNT array top surfaces fully covered by carbon nanoparticles 30. Thus, high surface area is created by the carbon nanotubes (CNT) and carbon nanohorns (CNH) and/or carbon nano-onions (CNO). The surface area of the carbon nanoparticle covered CNT is 3-4 times larger than that without the nanoparticles (Current state of the art: CNT electrode: 300-400 m$^2$/g vs. CNH enhanced CNT electrode 1500 m$^2$/g).

Figure 4:
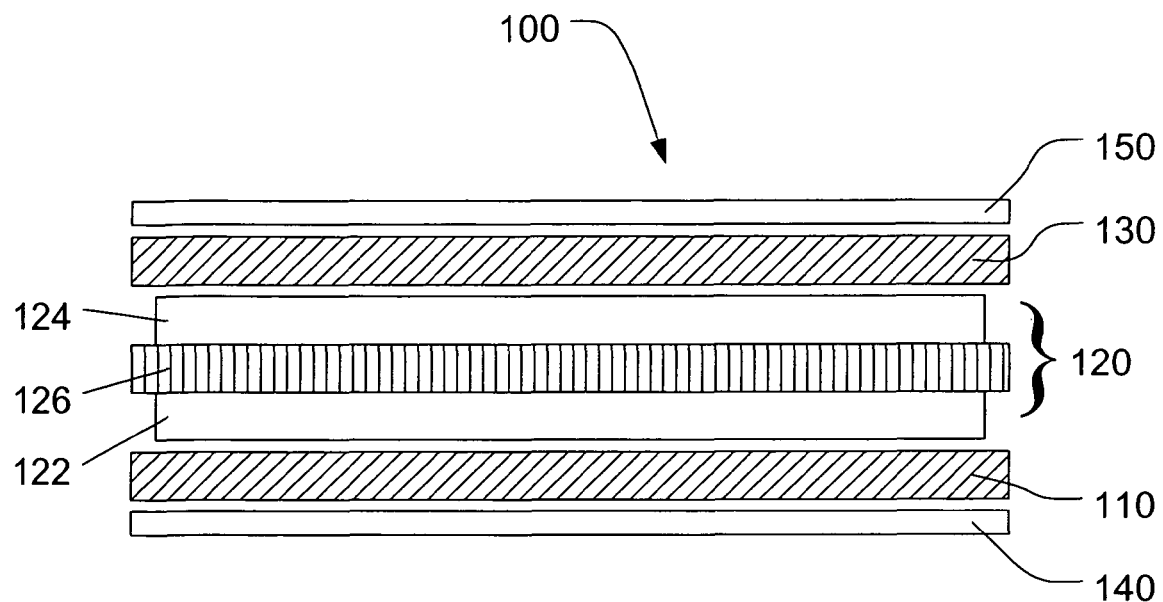
FIG. 4 is a schematic illustration of a thin film energy storage device structure.

Referring now to FIG. 4, a basic structure of a multi-layered energy storage device 100 comprises a first sheet of a conductive material 110, a sheet of a free ion conductive electrolyte 120 disposed on the first sheet of the conductive material 110, and a second sheet of same or different conductive material 130 disposed on the sheet of the electrolyte 120. The first sheet 110, the sheet of the electrolyte 120 and the second sheet 130 form a basic multi-layered stack. The first and the second conductive sheets 110 and 130 are used as electrodes (anode and cathode).

The sheet of the electrolyte 120 may have different constructions. One example is that it comprises a separator layer 126. The separator 126 may be a thin sheet of micro-perforated plastic such as a polymer-based membrane, e.g. a 25 μm thick polyethylene (PE)-polypropylene (PP) (trade name CELGARD), or any suitable material such as paper. As the name implies, the separator is an ionic conductor but electric insulator that separates the first and the second conductive sheets while allowing the free ions to pass through. The separator 126 may further filled with or applied thereon an electrolyte (electrolyte layers 122 and 124 on both surfaces of the separator layer 126 are shown). An electrolyte is any substance containing free ions that behaves as an electrically conductive medium. Besides conventional organic electrolytes such as ethylene carbonate (EC), diethylene carbonate (DC) and propylene carbonate (PC), a room temperature ionic liquid (RTIL) electrolyte, for example, 1-butyl, 3-methylimidazolium chloride ([BMIM][Cl]) composing of 1-25% cellulose and a lithium salt, can be preferably used as a gel electrolyte for the fabrication of a fully solid state rechargeable battery. The RTIL gels are non-flammable, flexible and environmentally safe.

The first conductive sheet 110 and/or the second conductive sheet 130 may further comprise a metal foil base layer (acting as a charge collector) and a charge storage or charge supply layer. The charge storages layer may be composed of the CNT/CNH(CNO) nanostructure as shown in FIG. 3b. The CNT layer may be grown on the metal foil base layer as shown in FIG. 3a or it may be formed by other methods. The charge supply layer may be composed of a compound, such as a lithium metal oxide, lithium metal, or carbon nanostructure material, depending on the type of the device. In the device structure, the charge storage layer and charge supply layer face the electrolyte layer 120. The device structure 100 further comprises a first insulator sheet 140 and a second insulator sheet 150 disposed on outer surfaces of the multiplayer stack.

Following is a brief description of various types of energy storage devices according to the present invention.

1. Lithium Ion Battery Structure

Figure 5A:
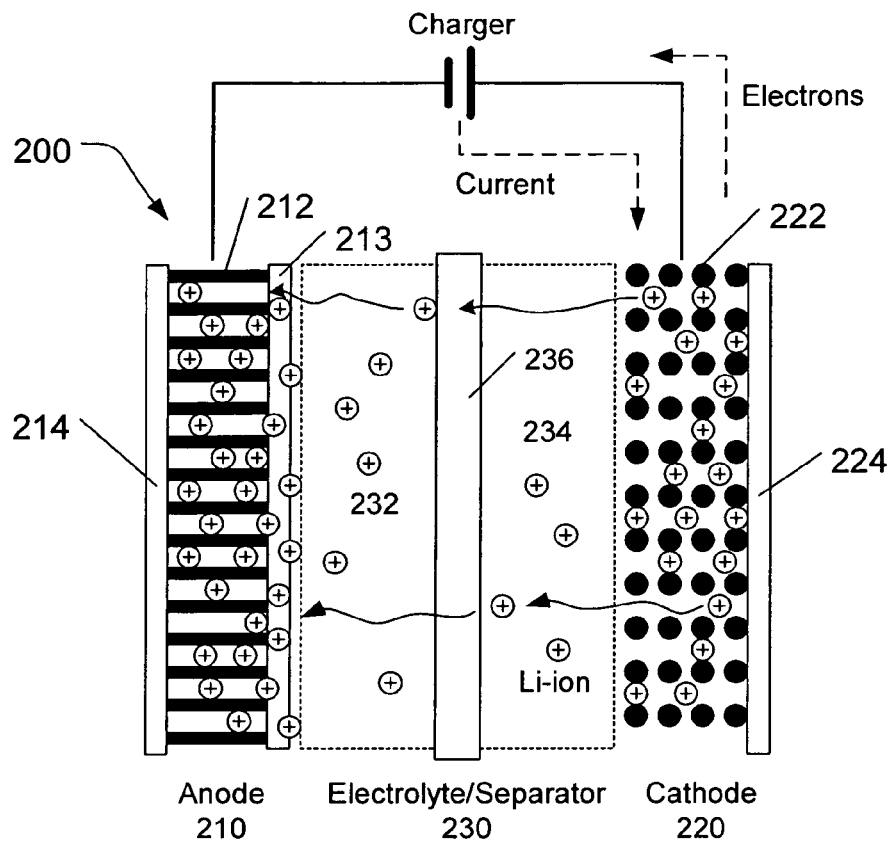
FIGS. 5a and 5b illustrate the charging and discharging mechanisms of a lithium ion battery, in which the anode comprises a complex CNT/CNH(CNO) nanostructure.
Figure 5B:
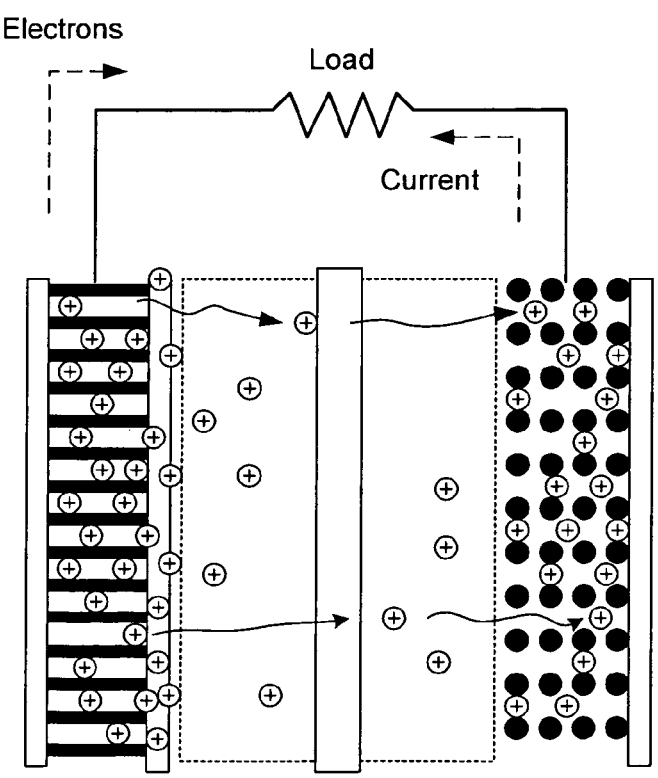

FIGS. 5a and 5b show respectively the charge and discharge mechanisms of a lithium ion battery 200 according to the present invention. Inside the battery 200, the anode 210 (negative electrode) is made of a complex carbon nanostructure which includes a CNT layer 212 directly grown on a metal foil substrate 214 and a carbon nanoparticle (CNH, CNO or other types of carbon nanoparticles) layer 213 disposed on the CNT layer 212, and the cathode 220 (positive electrode) is made of a lithium metal oxide layer 222 and a metal foil charge collector layer 224. Examples of lithium metal oxide include lithium cobalt oxide (LiCoO$_2$), lithium manganese oxide (LiMnO$_4$) and lithium nickel oxide (LiNiO$_2$). A more advanced cathode may be made with LiFePO$_4$. When the battery is charged, i.e. electrons are supplied to the anode, positively charged lithium ions migrate from the cathode 220 and intercalate into the carbon nanostructure layer 212/213 (FIG. 5a). When the battery is discharged, positive lithium ions move back from the anode 210 to replace the missing charges in the cathode 220 (FIG. 5b). In either direction, the lithium ions diffuse through the electrolyte/separator 230, which is composed of a separator layer 236 and electrolyte layers 232 and 234.

2. Lithium Metal Battery Structure

Figure 6:
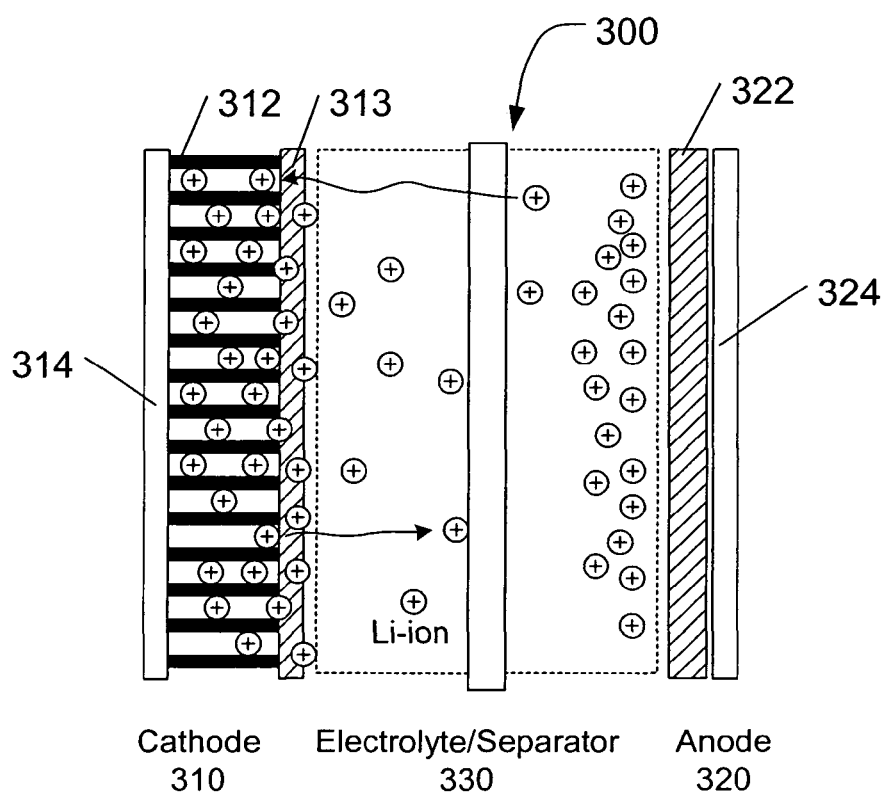
FIG. 6 is a schematic illustration a lithium metal battery in which the cathode comprises a complex CNT/CNH(CNO) nanostructure.

FIG. 6 shows a structure of a rechargeable lithium metal battery 300 according to the present invention. Inside the battery 300, the cathode 310 is made of a complex carbon nanostructure which includes a CNT layer 312 directly grown on a metal foil substrate 314 and a carbon nanoparticle (CNH or CNO) layer 313 disposed on the CNT layer 312, and the anode 320 is made of a layer of lithium metal 322 and a metal foil charge collector layer 324. When charging or discharging the battery, the lithium ions diffuse through the electrolyte/separator 330.

3. Supercapacitor Structure and Combined Battery-Capacitor Hybrid

Like regular capacitors, supercapacitors use the surface of the conductive plates for charge storage. The higher the surface area, generally the higher charge storage capacity. Therefore, high-surface-area carbon nanostructures are inherently suitable for use in the supercapacitors. In fact, many of the same materials as used in lithium metal/lithium ion batteries may be used in supercapacitors.

Figure 7:
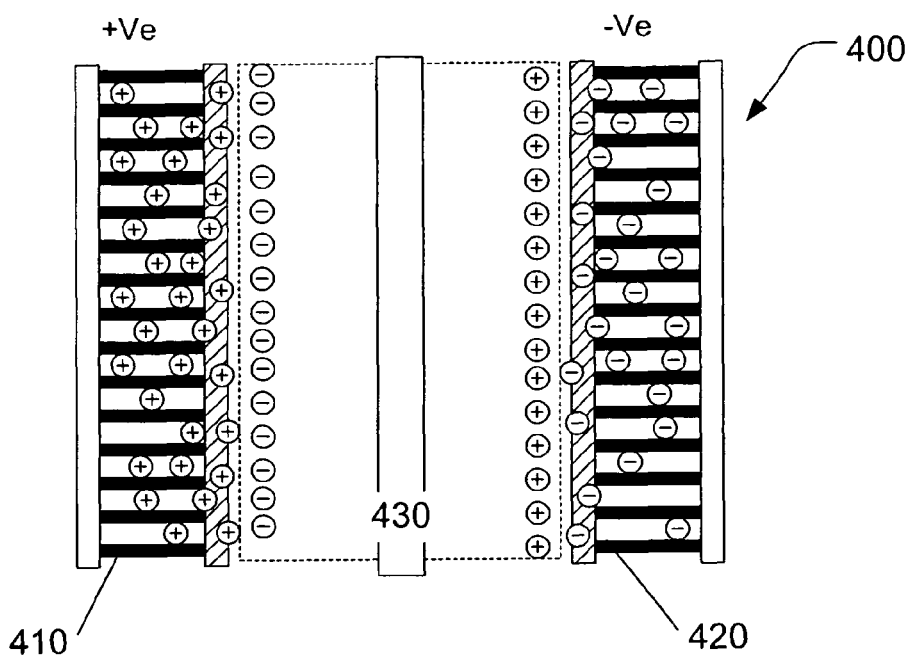
FIG. 7 is a schematic illustration of an electrochemical double layer capacitor (EDLC) in which one or both of the electrodes comprise the complex CNT/CNH(CNO) nanostructure.

FIG. 7 shows schematically an exemplary EDLC capacitor structure 400 according to the present invention. The structure comprises charge plates 410 and 420, separated by a separator/electrolyte 430. One or both of the charge plates 410 and 420 are composed of carbon nanostructures including a layer of CNTs grown on a flexible metal foil and a layer of carbon nanoparticles (CNH or CNO) disposed on the CNT layer for providing extremely high surface areas.

Figure 8:
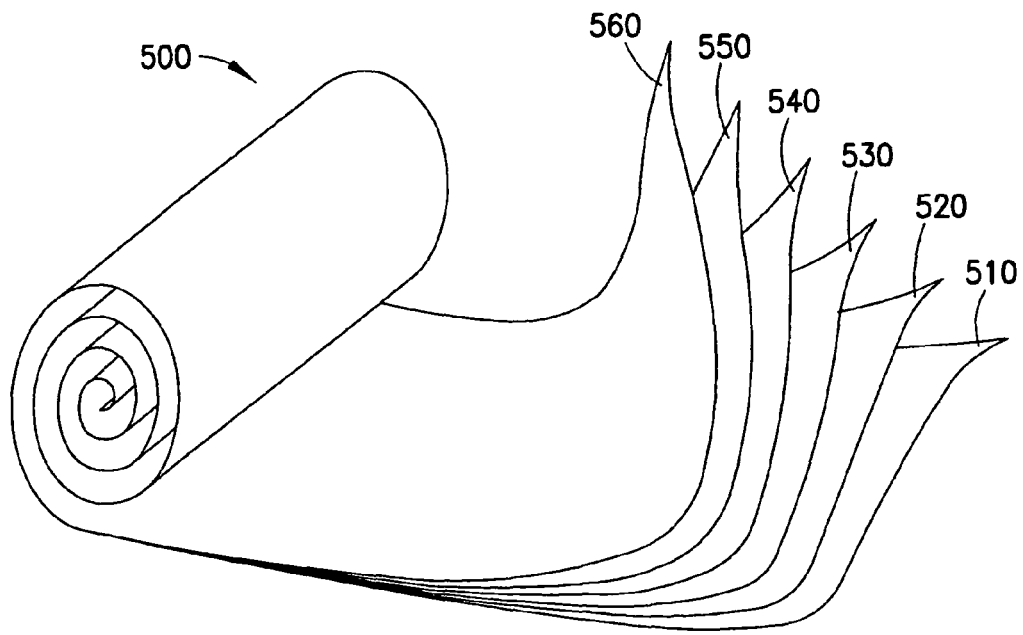
FIG. 8 is an example of a thin film lithium metal/lithium ion battery core that is produced by rolling a multi layered thin film stack.

FIG. 8 shows a particular example of the multi-layered energy storage structure of FIG. 3, in which, according to the present invention, at least one of the layers is a layer of complex carbon nanostructure on a metal foil. The structure 500 comprises a first layer of insulator 510, a metal foil charge collector 520, a layer of Li metal foil or lithium metal oxide 530, a layer of separator integrated with solid state lithium electrolyte 540 as mentioned above, a layer 550 of metal foil with CNT structure directly grown thereon and CNH or CNO disposed on the CNT, wherein the nanoparticle layer faces the electrolyte, and a second layer of insulator 560.

A practical energy storage unit is made by folding or rolling up the stacked sheets, of which width and length of the stack are much larger than the thickness. For the example shown, the multi layer stack 500 is rolled into a cylindrical shape. The roll is then hermetically sealed. Preferably, the fabrication process takes place in an inert gas environment that is oxygen-free (e.g. oxygen level not exceeding 5 ppm).

Figure 9:
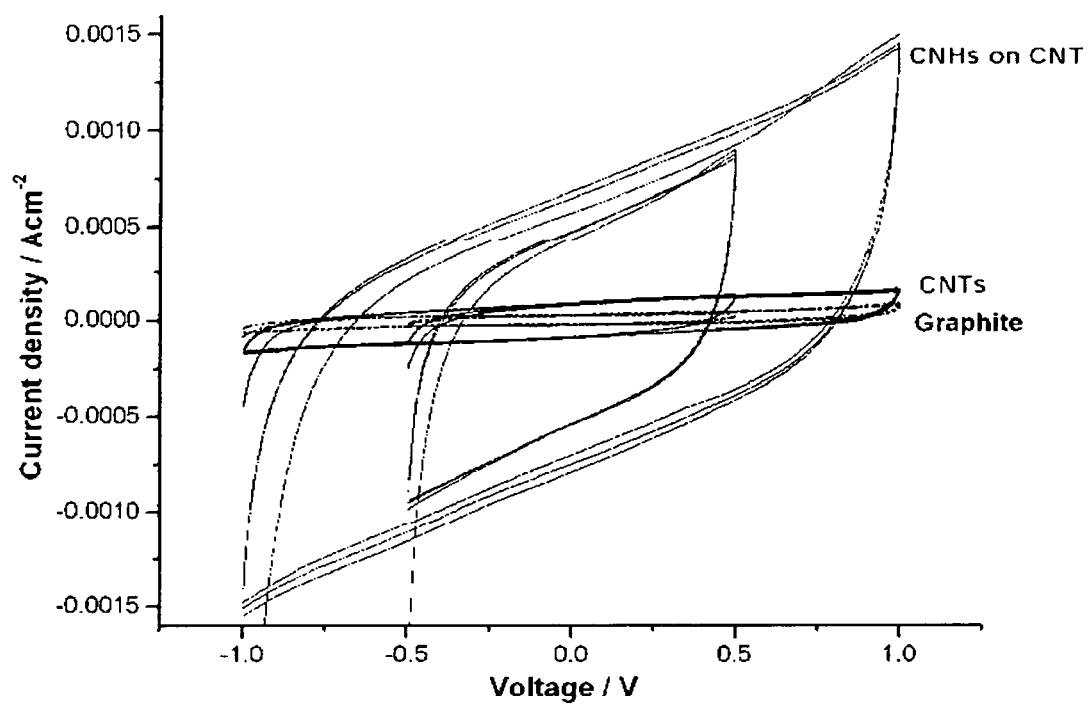
FIG. 9 is cyclic voltammetry data of EDLCs made with CNT charge collector, CNT/CNH charge collector compared with that made with graphite charge collector.

FIG. 9 is exemplary cyclic voltammetry data of EDLC capacitors made with charge collecting plates (1) graphite, (2) CNTs grown on flexible Al foil, and (3) CNHs on CNT layer. The data show that the supercapacitor made with the CNT/CNH layer can achieve much higher discharge current density than that made only a CNT layer. It is shown clearly that after the deposition of CNHs on top of the CNTs, the charging current is increased significantly.

In summary, the present invention provides a process for growing CNT structure on a flexible metal substrate and fabricating a complex carbon nanostructure for use in energy conversion and storage devices. The metal substrate with the CNT structure can be directly used in fabrication energy conversion and storage units suitable for portable electronic devices. Due to the extremely large surface area, CNT/CNH (CNO) nanostructure on a metal foils is very advantageous over traditional graphite electrodes.

The application can also be extended to photovoltaic devices and fuel cells which use the same electrode structure. In addition, other types of carbon nanostructured materials can also be fabricated. This process can further enable the roll-to-roll fabrication of nanostructured electrodes for industrialized mass production.

It is to be understood that the above-described arrangements are only illustrative of the applications of the principles of the teachings hereof. In particular, it should be understood that although only a few examples have been shown, the teachings hereof are not restricted to those examples. Numerous modifications and alternative arrangements may be devised by those skilled in the art without departing from the scope of the present disclosure.

The invention claimed is:

1. A flexible hybrid battery-capacitor, comprising:
   a first sheet of a conductive material;
   a sheet of room temperature ionic liquid electrolyte disposed on the first sheet of the conductive material, the room temperature ionic liquid electrolyte being able to conduct free ions therein; and
   a second sheet of same or different conductive material disposed on the sheet of the room temperature ionic liquid electrolyte,
      wherein both the first sheet of conductive material and the second sheet of conductive material comprise:
         a metal foil layer having a thickness of about 5 to 100 microns,
         a carbon nanotube layer directly grown on the metal foil layer,
         a layer of carbon nanoparticles disposed on the carbon nanotube layer, wherein the carbon nanoparticle layer is arranged to face the sheet of the room temperature ionic liquid electrolyte;
   the first sheet of a conductive material is an anode and the second sheet of conductive material is a cathode, and wherein the room temperature ionic liquid electrolyte comprises 1-butyl, 3-methylimidazolium chloride comprising 1-25% of cellulose and a lithium salt.

2. The flexible hybrid battery-capacitor of claim 1, wherein the first sheet of conductive material, the sheet of the room temperature ionic liquid electrolyte and the second sheet of conductive material form a multi-layered stack, and the flexible hybrid battery-capacitor further comprises a first insulating sheet and a second insulating sheet disposed on outer surfaces of the multi-layered stack, respectively.

3. The flexible hybrid battery-capacitor of claim 2, wherein the flexible hybrid battery-capacitor has larger width and length than thickness, the flexible hybrid battery-capacitor is rolled up or folded and then hermetically sealed to form an energy storage unit.

4. The flexible hybrid battery-capacitor of claim 3, wherein the first and the second conductive sheets are configured to engage with an external energy source or drain.

5. The flexible hybrid battery-capacitor of claim 1, wherein the metal foil layer is one of the following: aluminum, copper, iron, and alloys of aluminum, copper or iron.

6. The flexible hybrid battery-capacitor of claim 1, wherein the carbon nanotube layer is directly grown on the metal foil layer by a process that comprises:
   coating a catalyst on a surface of the metal foil layer of the first sheet or the second sheet by low temperature evaporation of the catalyst;
   annealing the catalyst coated metal foil layer in ammonia gas at a first temperature; and
   growing the carbon nanotubes directly on the catalyst coated surface of the metal foil layer in a hydrocarbon gas atmosphere at a second temperature, wherein the first temperature is lower than the second temperature and the second temperature is no higher than 550° C.

7. The flexible hybrid battery-capacitor of claim 1, wherein the sheet of the room temperature ionic liquid electrolyte comprises a sheet of microperforated plastic film and the room temperature ionic electrolyte disposed on surfaces of the microperforated plastic film.

8. The flexible hybrid battery-capacitor of claim 7, wherein the microperforated plastic film is a membrane made of polyethylene (PE)- polypropylene (PP).

9. The flexible hybrid battery-capacitor of claim 1, wherein the carbon nanotube layer comprises carbon nanotubes, wherein the carbon nanotubes in the carbon nanotube layer are at least partially aligned in a direction, said direction being at least nearly perpendicular to the surface of the metal foil layer.

10. The flexible hybrid battery-capacitor of claim 1, wherein the carbon nanoparticles are carbon nanohorns, carbon nano-onions or a combination of two or more kinds of carbon nanoparticles.

* * * * *